United States Patent [19]

Scop et al.

[11] Patent Number: 5,283,546

[45] Date of Patent: Feb. 1, 1994

[54] VANDAL-RESISTANT CALL BOX

[75] Inventors: Shlomo Scop, Netanya, Israel; Jack K. Galbraith, Lombard, Ill.; Efi Rushinek, Ramat Gan; Martin Ferester, Hulon, both of Israel

[73] Assignee: Motorola, Inc., Schaumburg, Ill.

[21] Appl. No.: 699,108

[22] Filed: May 13, 1991

[51] Int. Cl.⁵ .................................. G08B 25/00
[52] U.S. Cl. ............................. 340/287; 379/37; 379/45; 379/424; 379/438
[58] Field of Search ............. 340/287, 286.06, 300, 340/301, 305, 306, 539, 471; 455/33.1, 33.2, 33.3, 33.4; 379/37, 43, 44, 59, 63, 45, 40, 51, 49, 419, 424, 445, 447, 453, 145, 438

[56] References Cited

U.S. PATENT DOCUMENTS

| | | | |
|---|---|---|---|
| 2,673,252 | 3/1954 | Henrikson | 379/424 |
| 3,009,023 | 11/1961 | Ruth | 379/37 |
| 4,176,254 | 11/1979 | Tuttle et al. | |
| 4,658,096 | 4/1987 | West, Jr. et al. | |
| 4,672,601 | 6/1987 | Ablay | 379/63 |
| 4,724,538 | 2/1988 | Farrell | |
| 4,737,975 | 4/1988 | Shafer | |
| 4,749,359 | 6/1988 | White | 379/419 |
| 4,788,711 | 11/1988 | Nasco, Jr. | |
| 4,817,126 | 3/1989 | Hendershot | |
| 4,819,263 | 4/1989 | Franklin | |
| 4,989,239 | 1/1991 | McGarry | 379/145 |
| 5,086,463 | 2/1992 | Vesely et al. | 379/40 |

FOREIGN PATENT DOCUMENTS 3417931 11/1985 Fed. Rep. of Germany ...... 379/438

OTHER PUBLICATIONS

Bell Laboratories Report, "Vandal-Resistant Mount for Coin Telephones", Sep. 1972, p. 266.

*Primary Examiner*—Brent Swarthout
*Attorney, Agent, or Firm*—Susan L. Lukasik; Steven G. Parmelee; Raymond A. Jenski

[57] ABSTRACT

A call box (201) provides vandal-resistant operation by using a concealed magnetic switch and magnet (179) and specially locked compartments (101 and 103) in a heavy duty structure. The concealed magnetic switch determines the position of a handset (119) within the call box (201). When the handset (119) is removed from its resting position, a radio (129) within the call box (201) responds when a pushbutton (127) within the call box (201) is pressed. When the pushbutton (127) is pressed, telephone service is provided via a radio (129) to a preprogrammed phone number, such as the highway patrol for a call box (201) located on a highway, to handle situations such as a malfunctioning vehicle.

14 Claims, 3 Drawing Sheets

VANDAL-RESISTANT CALL BOX

FIELD OF THE INVENTION

This invention relates to call boxes. More particularly, this invention relates to call boxes using RF communications.

BACKGROUND OF THE INVENTION

Call boxes provide emergency service to remote locations, such as along highways, in parks, and on college campuses. Such emergency service includes telephone communications to an operator who has access to the police or the fire department. In order to alleviate the problem of wiring telephone service to the call box, many call boxes use cellular phones. When a user activates a switch in the box, the cellular phone within the call box automatically dials a programmed phone number, and the user is granted telephone access to the location with that programmed phone number, such as an operator in an emergency center. The public availability, coupled with the remote locations of call boxes, make call boxes easy targets for vandals. In many call boxes, the user simply pushes a button to obtain immediate assistance. Because the procedure is so simple, vandals may press the button or even damage the box just for the "fun" of it. Likewise, thieves may wish to steal the cellular phone for its resale value. Such tampering clearly reduces the effectiveness of a call box.

Accordingly, a call box that is simple to use yet resists vandalism and theft is required.

DESCRIPTION OF A PREFERRED EMBODIMENT

The following describes a method of and apparatus for handling telephone calls from a call box that is vandal-resistant. Provision is made for a magnetic switch, concealed from sight within a handset mounted within the call box. While the handset is in its resting position, the switch is closed, preventing the call box from requesting phone service. When the handset is removed and a pushbutton in the callbox is activated, a call is placed. A physically secured compartment for housing equipment and an armored handset cord are also incorporated to resist vandals.

Figure 1A:
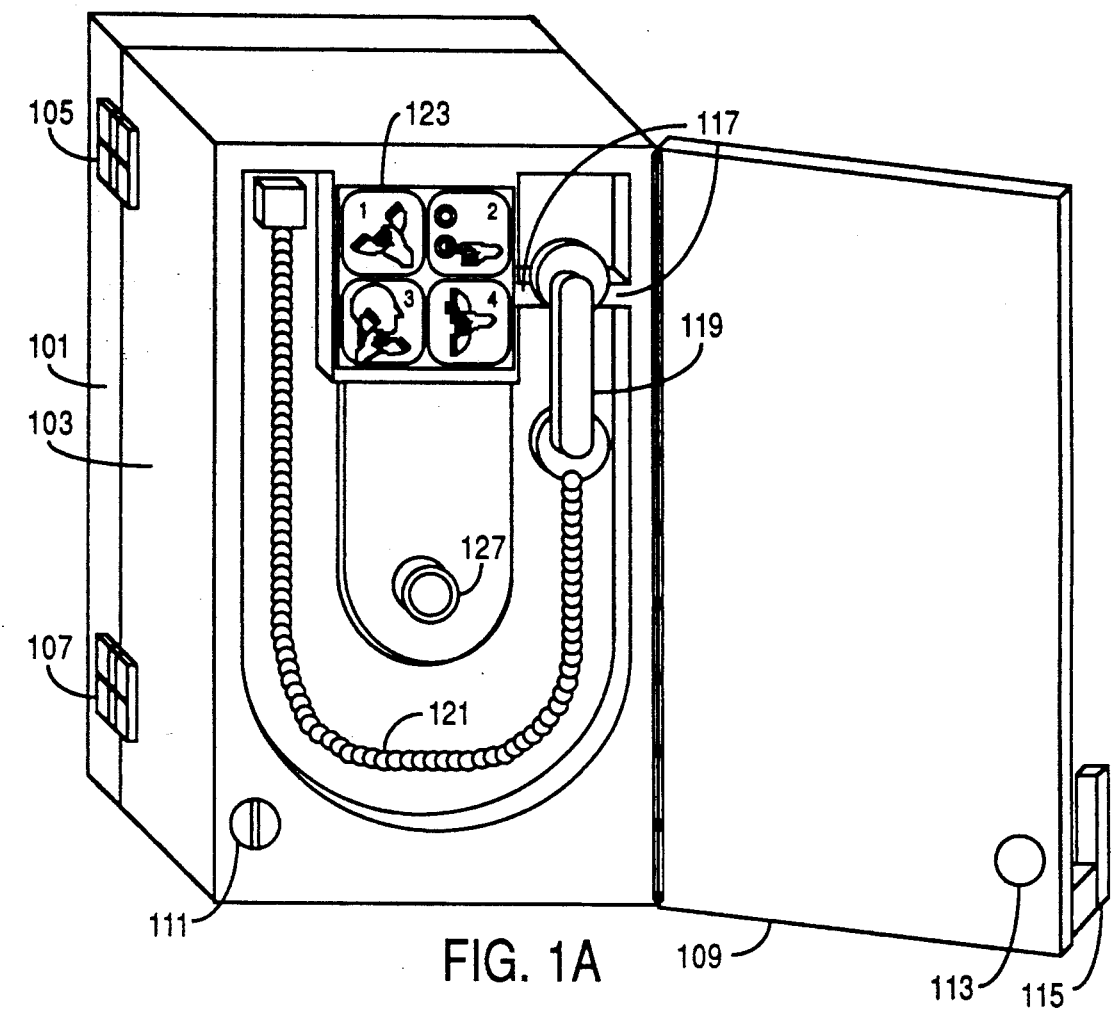
FIG. 1A is a diagram of a call box with external door open in accordance with the invention.

FIG. 1A is a diagram, not drawn to scale, of a call box with its external door open. A ruggedly constructed box, containing the hardware necessary to provide call box functions, is made from aluminum in the preferred embodiment. This box has three sections: an external door 109, a front compartment 103, and a mounting block 101. The front compartment 103 is hinged to the mounting block 101 with two hinges 105 and 107 and may only be opened with the proper key, as described in the text for FIG. 1B. The external door 109, hinged to the front compartment 103, provides environmental protection when the call box is not in use. When the external door 109 is closed, the front compartment 103 extends beyond the external door 109 for further environmental protection. When a user needs to make a call, he/she opens the external door 109 using a handle 115 mounted on the door 109. The user follows instructions 123, illuminated from dusk to dawn, to place the necessary call. The user is instructed to remove the handset 119 from the depicted resting position, i.e., on resting supports 117, and then push the pushbutton. The pushbutton 127 is red in color and provides access to an operator, such as an operator in an emergency center, as designated in the instructions. The user then speaks to the operator as in a normal telephone conversation (full-duplex operation). The user is instructed to hand up the phone on its supports 117 when the call is complete. The handset cord 121, which is attached to the handset 119 and the front compartment 103, is armored to withstand excessive wear and tear and to prevent vandals from damaging the cord. The nature of the armored cord 121 coupled with the proximity of the handset 119 to the top edge of the front compartment makes it practically impossible to hand up the handset 119 upside-down. A magnetic switch 111 is observed by control logic (as described in the text for FIG. 1B and FIG. 3).

Figure 3:
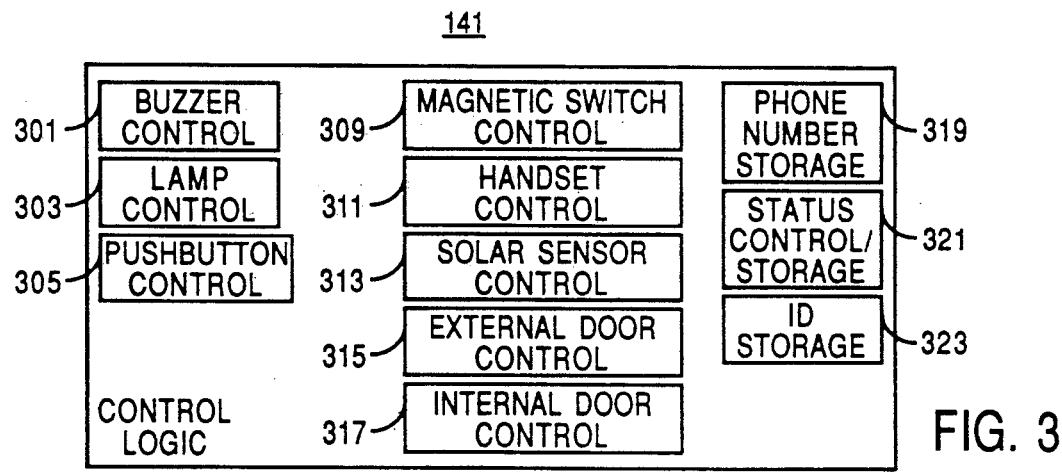
FIG. 3 is a diagram of control logic for a call box in accordance with the invention.
Figure 4:
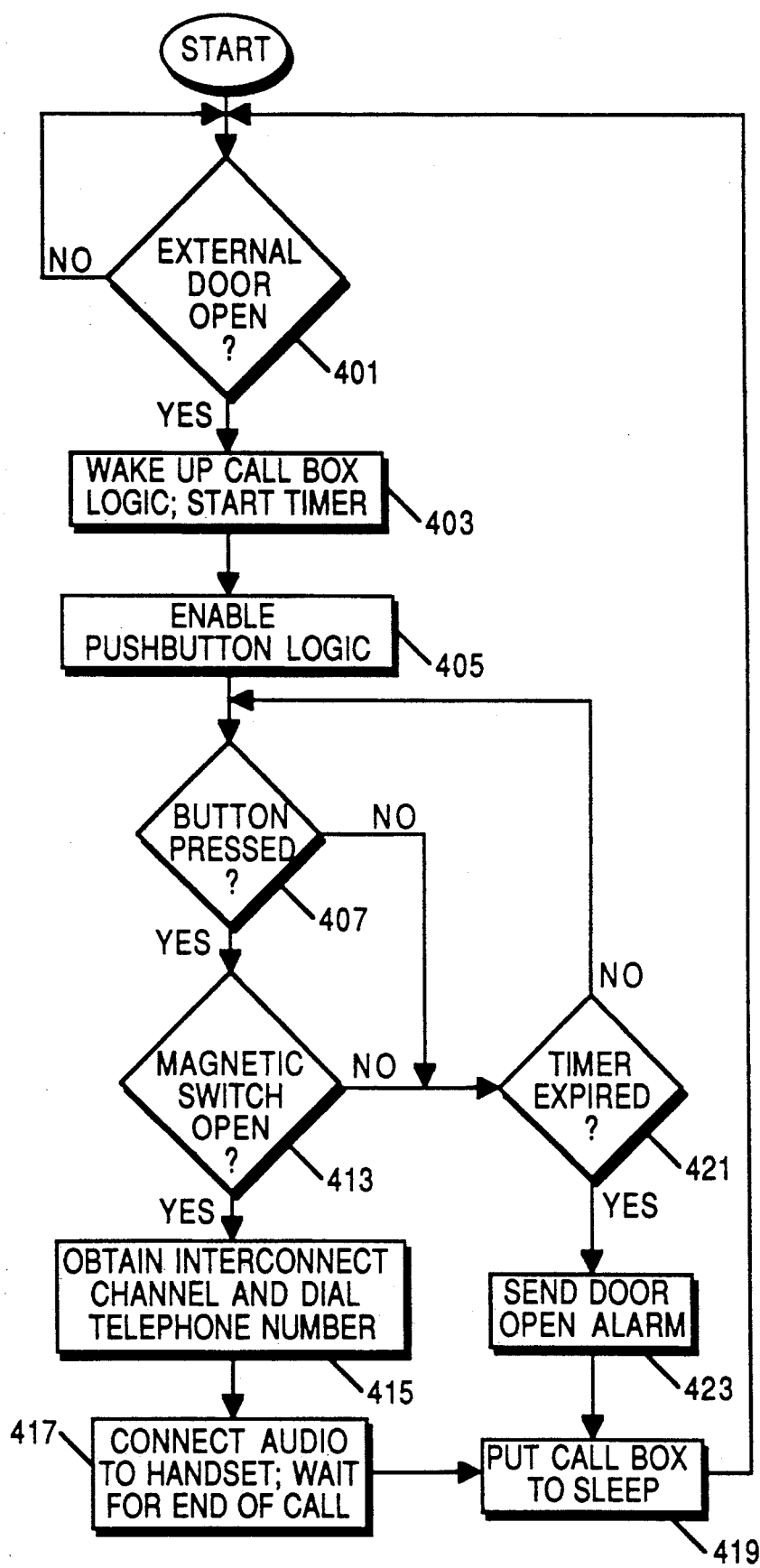
FIG. 4 is a flowchart showing handling of calls by a call box in accordance with the invention.

When the external door 109 is opened, the magnetic switch 111 breaks contact with a metal disk 113 attached to the external door 109, and the control logic wakes (powers up) the call box and starts a time-out circuit, which automatically puts the call box in power conservation mode (disables unnecessary circuitry) after the time-out period, as described in the text for FIG. 3 and FIG. 4.

Figure 1B:
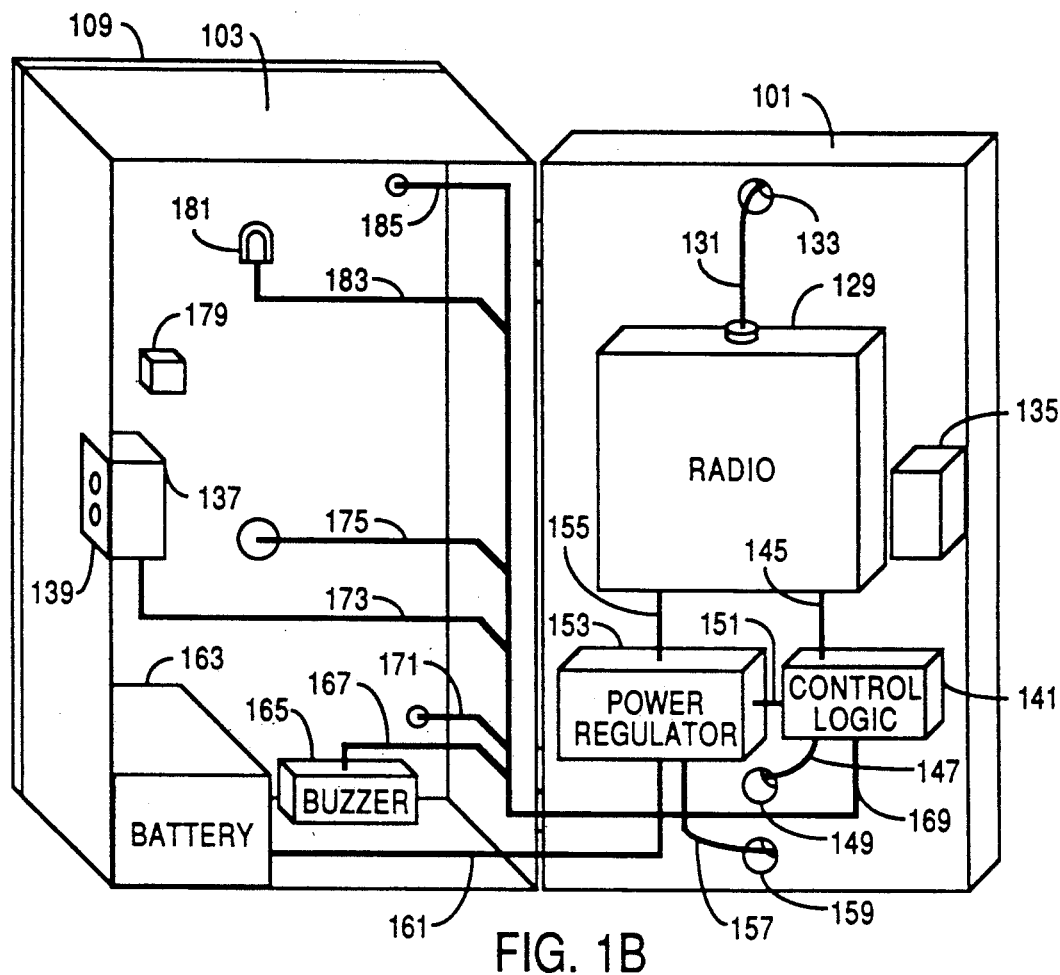
FIG. 1B is a diagram of a call box with internal door open in accordance with the invention.

FIG. 1B is a diagram, not drawn to scale, of a call box with internal door open. The internal door is the front compartment 103, which is hinged to the mounting block 101 with two hinges 105 and 107 such that when the front compartment is rotated on the hinges 105 and 107, an inner compartment is revealed, housing a trunked radio 129 and hardware to perform the call box functions. The inner compartment may only be accessed if the proper tools are used. A panel 139 exterior to a locking mechanism 137 attached to the front compartment 103 must be removed using non-standard tools to prevent vandals from stealing or damaging the radio 129 or other internal equipment. Once this external panel 139 is removed, a key slot (not shown) in the locking mechanism 137 is revealed. Whenever the key slot is properly used to open the locking mechanism 137, the locking bracket 135 attached to the mounting block 101 separates from the locking mechanism 137, and an alarm is sent via a wireline connection 173 to the control logic 141 attached to the mounting block 101. The trunked radio 129, such as a full-duplex MAXTRAC TM, available from Motorola, Inc., is attached to the mounting block 101. An electrical antenna connection 131 is connected to the radio's 129 antenna port and through a hole 133 in the mounting block to an external directional antenna. A power regulator 153 receives electrical power along connection 161 from a battery 163 mounted in the front compartment 103. The regulator 153 receives power via connection 157 to charge the battery 163 either from an AC power source or a solar panel accessed through a hole 159 in the mounting block 101. The regulator 153 provides regulated power through one connection 151 to the control logic 141 and through another connection 155 to the radio 129. The control logic 141 receives various inputs from a bus connection 169, processes the information accordingly (see the text for FIG. 3), and passes control and voice data through a bus connection 145 to the radio 129. A line 147 connected through a hole 149 in the mounting block 101 to a solar sensor (not shown) carries solar panel tamper/damage data. A buzzer 165, used to summon the user if the operator puts the call on hold, receives instructions from the control logic 141 via its connection 167 to the bus 169. A connection 171 from magnetic switch 111 to the bus 169 tells the control logic 141 when the external door 109 is open. A connection 175 from the pushbutton 127 to the bus 169 tells the control logic 141 when the pushbutton 127 has been pressed. A conventional magnetic switch (not shown) is fixed in the mouthpiece of the handset 119, and a conventional magnet 179 is placed near the handset 119 mouthpiece, but on the inner compartment wall 103. In the preferred embodiment, when the handset 119 is resting on its supports 117, the magnetic switch in the handset 119 is closed by the magnet 179, and the control logic 141 prevents any call from being originated, even if the pushbutton 127 is pressed. The magnetic switch in the handset 119 shorts the two microphone wires in the handset when the switch is closed. The control logic 141 senses this short. Use of the magnetic switch to prevent calls from being originated when the handset 119 is on its supports 117 aids in preventing vandals from sending false alarms. A lamp 181, which illuminates the instructions 123 as directed by the control logic 141, receives its power via connection 183. Voice data to/from the handset 119 travels to/from the control logic 141 via a 4-line bus 185 to the control logic bus 169.

Figure 2:
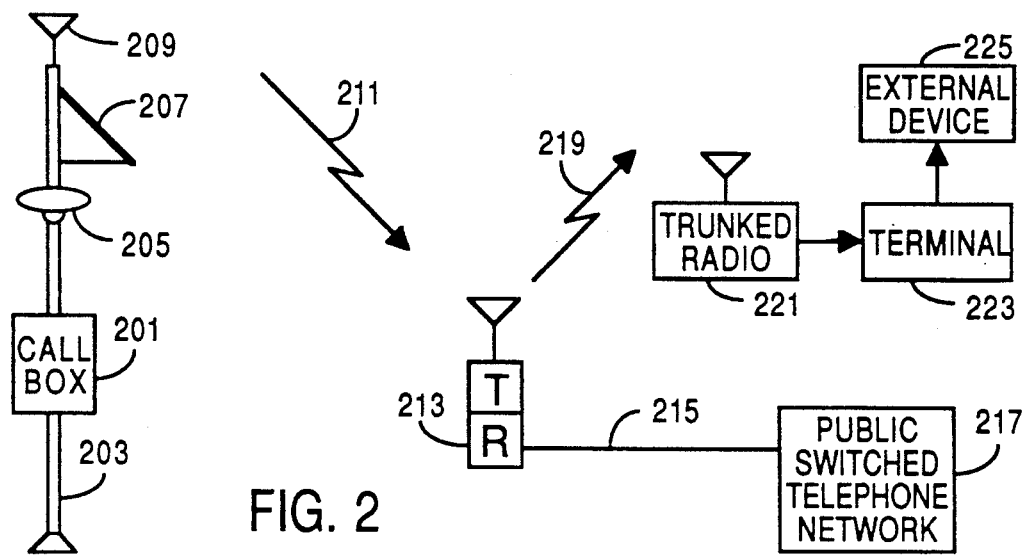
FIG. 2 is a diagram of a system including a call box in accordance with the invention.

FIG. 2 is a diagram of a system including a call box. The call box 201 is mounted on a pole 203 using the mounting block 101 shown in FIG. 1. The call box 201 is mounted a distance above the ground such that it is easily reached by most people. An optional lamp 205 provides illumination and security for the user. An optional solar panel 207, such as a conventional solar panel with output power compensated for sun conditions in the geographical region of the call box, and directional antenna 209 are mounted near the top of the pole 203 out of normal reach. The connection 131 from the antenna 209 to the radio 129 and the connection 157 from the solar panel 207 to the power regulator, as shown in FIG. 1, are internal to the pole 203 to prevent tampering or vandalism and provide environmental protection for the cables 131 and 157. When the pushbutton 127 is pressed, an ISW is automatically placed on the control channel 211 of the trunked radio system, the ISW requesting connection to a phone number programmed in the control logic 141 of the call box. This ISW is received at the trunked base station 213. The central controller, which handles traffic on the trunked system, including channel assignment, puts the call request in the channel request queue for the trunked system. When the call box's turn comes up in the queue and a channel becomes available for the request, the central controller sends an Outbound Signalling Word (OSW), with the RF channel assignment, to the call box and connects the assigned channel to the requested phone number via a connection 215 to the Public Switched Telephone Network. A cellular phone may also be used to provide such service, using a cellular base station/base site which must perform the tasks of the central controller.

FIG. 3 is a diagram of control logic 141 shown in FIG. 1A for a call box 201. In the preferred embodiment, the control logic 141 includes a microprocessor, such as a 68HC11 microprocessor available from Motorola, Inc. Buzzer control logic 301 causes the buzzer 165 to sound when a signal is sent by the system operator, for example, if the operator wishes to summon the user back to the call box 201 when the user is placed on hold. Lamp control logic 303 turns on and off the lamp 181 which illuminates (back-lights) the instructions 123, using a built-in programmable storage table with turn-on and turn-off times. The lamp control logic 303 turns on the lamp only when the external door 109 is opened during the times programmed into the storage table. The lamp control logic 303 turns off the lamp upon receipt of a lamp turn-off signal from the external door control logic 315. Magnetic switch control logic 309 receives a signal from the magnetic switch in the handset 119 when the switch is open, indicating that the handset 119 has been removed from its supports 117. The magnetic switch control logic 309 then sends an enable signal to the pushbutton control logic 305 that enables the logic block 305 to perform its designated functions. Once the pushbutton control logic 305 receives the enable signal from the switch logic 309, the pushbutton control logic 305, upon receipt of a signal from the pushbutton 127 when it 127 is pressed, sends a signal to the radio 129 via bus 145, telling the radio 129 to issue its preprogrammed call request ISW with the telephone number stored in the phone number storage block 319. Handset control logic 311 handles voice data and handset tampering data from the handset 119. Voice data is passed to/from the radio 129 via bus 145. The handset tampering data is sent to the status control/storage logic 321 to be handled. This logic 311 also contains a microphone noise filter and earpiece volume control that are actuated by the system operator. Solar sensor control logic 313 receives solar panel tamper/damage data via a connection 147 to the solar panel 207. The solar sensor control logic 313 sends tamper or damage information to the status control/storage block 321, which sends a message to the system operator indicating the problem. External door control logic 315 receives an open-door signal via connection 171 whenever the external door 109 is opened. A timer with a programmable time-out is started within the external door control logic 315 when the open-door signal is received. If the timer expires before the external door 109 is closed, or if the door is closed, this control logic 315 sends a lamp turn-off signal to the lamp control logic 303 to turn off the lamp 181 and a sleep signal to the status control/storage logic 321 to conserve power. Internal door control logic 317 receives a signal via a connection 173 from the locking mechanism 137 whenever the lock is opened with or without the proper key. The internal door control logic 317 sends an alarm to the status control/storage block 321, which initiates a call to the system operator via an optional computer terminal (not shown) connected to the PSTN 217 indicating that the box is open. The status control/storage block 321 has a 24-hour clock to provide time to the call box, especially the lamp control logic 303. The status control/storage block 321, upon receipt of the sleep signal from the external door control logic 315, turns off power to the radio 129 and other control logic unnecessary for functionality when a call is not taking place. This logic block 321 also receives status requests via the computer terminal from the system operator and supplies any requested data, such as tamper status, maintenance record, time-out parameters, or the call box 201 ID (identification) number from the ID storage block 323. The status control/storage block 321 monitors the call box 201 functions and reports any problems requiring maintenance to the system operator. The status control/storage block 321 also receives programming data from a computer terminal, as requested by the system operator, and programs the call box 201 with that data.

FIG. 4 is a flowchart showing handling of calls by a call box 201. If the external door is open 109 at step 401, the call box is awakened, i.e., powered up, and an external door time-out timer is started at step 403. The pushbuttons control logic 305 is enabled at step 405. If the pushbutton is pressed at step 407, the process continues with step 413. If at step 413 the magnetic switch in the handset 119 is closed, signifying that the handset 119 is on its supports 117, or if no button has been pressed at step 407, the process continues with step 421. If at step 413 the magnetic switch in the handset 119 is open, signifying that the handset 119 is not on its supports 117, an interconnect channel is obtained via the control channel and the telephone number is dialed at step 415, and the process continues with step 417. At step 417, the audio from the telephone call is connected to the handset 119, providing normal voice telephone operation between the user and system operator or other person whose phone number is programmed into the box, and the call box waits for the end of the call, which is determined by the system operator. At step 419 the call box is put to sleep, i.e., all circuits unnecessary for functionality when a call is not taking place, including certain radio functions, are disabled to save power, and the process continues with step 401. If at step 421, the external door time-out timer has not expired, the process continues with step 407. If at step 421, the external door time-out timer has expired, an open door alarm is sent to the system operator step 423 so that arrangements may be made to close the door. The process then continues with step 419.

What is claimed is:

1. A call box, comprised of:
   means for holding a handset in a first position within the call box and alternatively in a position upside-down to said first position;
   means, concealed within the call box, for determining position of said handset within the call box;
   means for requesting telephonic service to said handset;
   means, coupled to said requesting means and said determining means, for providing a telephonic connection when said telephonic service is requested while said handset is removed from said first position within the call box;
   means for preventing said handset from being replaced in said position upside-down to said first position, wherein said means for preventing comprise:
   an armored cord attached to said handset and to said call box and
   a u-shaped recess within said call box in which said armored cord tracks a u-shape and in which said handset rests on supports such that an exterior door of said call box closes only when said handset rests in said first position; and
   means for protecting said means for holding, said means for determining, said means for requesting, said means for providing, and said means for preventing.

2. The call box of claim 1, wherein said determining means further comprises a magnetic switch.

3. The call box of claim 1, wherein said requesting means further comprises a pushbutton.

4. The call box of claim 1, wherein said providing means further comprises a trunked radio with telephonic capability.

5. The call box of claim 1, wherein said providing means further comprises a cellular telephone.

6. The call box of claim 1, further comprising means for providing illuminated instructions from twilight to dawn.

7. The call box of claim 1, further comprising:
   means for detecting entry to the call box; and
   means, responsive to said detecting means, for providing notice to a control site when entry has been made to the call box.

8. A call box, comprised of:
   at least two compartments, wherein a first compartment is accessible to the public and a second compartment is accessible with a special key;
   means for holding a handset in a first position within said first compartment and alternatively in a position upside-down to said first position;
   means, concealed within said second compartment, for determining position of said handset within said first compartment;
   means, within said first compartment, for requesting telephonic service to said handset;
   means, coupled to said requesting means and said determining means, for providing a telephonic connection when said telephonic service is requested while said handset is removed from said first position within the call box; and
   means for preventing said handset from being replaced in said position upside-down to said first position, wherein said means for preventing comprise:
   an armored cord attached to said handset and to said first compartment and
   a u-shaped recess within said first compartment in which said armored cord tracks a u-shape and in which said handset rests on supports such that an exterior door of said call box closes only when said handset rests in said first position.

9. The call box of claim 8, wherein said determining means further comprises a magnetic switch.

10. The call box of claim 8, wherein said requesting means further comprises a pushbutton.

11. The call box of claim 8, wherein said providing means further comprises a trunked radio, mounted within said second compartment, with telephonic capability.

12. The call box of claim 8, wherein said providing means further comprises a cellular telephone mounted within said second compartment.

13. The call box of claim 8, further comprising means, within said second compartment, for providing illuminated instructions within said first compartment from twilight to dawn.

14. The call box of claim 8, further comprising:
    means for detecting entry to said second compartment; and
    means, responsive to said detecting means, for providing notice to a control site when entry has been made to said second compartment.

* * * * *